Oct. 9, 1962

I. K. DORTORT 3,058,048

CONTROLLED BYPASS CIRCUIT

Filed Aug. 24, 1959

3 Sheets-Sheet 1

INVENTOR.
ISADORE K. DORTORT

BY Ostrolenk, Faber, Gerb & Soffen

ATTORNEYS

Oct. 9, 1962

I. K. DORTORT 3,058,048

CONTROLLED BYPASS CIRCUIT

Filed Aug. 24, 1959

3 Sheets-Sheet 2

$i_5 = i_6 = \frac{i_4}{2} + \frac{i_3}{2}$ (1)

$i_7 = i_8 = \frac{i_4}{2} - \frac{i_3}{2}$ (2)

$e_3 = e_5 - e_8 = e_6 - e_7$ (3)

$e_4 = e_5 + e_7 = e_6 + e_8$ (4)

$e_3 = e_5 - e_8 = e_6 - e_7$ (5)

HOLDS DURING BREAKS STEP AND WHEN $i_4 > i_3$

INVENTOR.
ISADORE K. DORTORT

BY Ostrolenk, Faber, Gerb & Soffen
ATTORNEYS

INVENTOR.
ISADORE K. DORTORT
BY Ostrolenk, Faber, Gerb & Soffen
ATTORNEYS

United States Patent Office 3,058,048

Patented Oct. 9, 1962

3,058,048

CONTROLLED BYPASS CIRCUIT

Isadore K. Dortort, Philadelphia, Pa., assignor to I-T-E Circuit Breaker Company, Philadelphia, Pa., a corporation of Pennsylvania Filed Aug. 24, 1959, Ser. No. 835,548
16 Claims. (Cl. 321—48)

My invention relates to a bypass circuit for contact devices and more specifically is an improvement of the devices set forth in U.S. application Serial No. 610,344, filed September 17, 1956, entitled "Transformer Bypass Circuit," in the name of Edward J. Diebold, and assigned to the assignee of the present invention, now Patent No. 2,925,547, and U.S. Patent No. 2,883,603, issued April 21, 1959, entitled "Cancellation of Break Step Current for Contact Converters" in the name of Isadore K. Dortort and assigned to the assignee of the present invention.

In the above noted application, a transformer by-pass circuit is provided wherein an auxiliary saturable reactor is connected in series with and between the commutating reactor and contact of a mechanical rectifier. The series connected auxiliary saturable reactor and contact are then connected in parallel with a rectifier circuit which is energized from an auxiliary A.-C. source which normally passes current through the rectifier in a first direction. This provides a bypass for the contact and permits the magnetizing current of the commutating reactor to flow therethrough in a direction opposite to the pre-established current flow from the auxiliary A.-C. source and in the blocking direction of the rectifier during the interval that the contact is to be opened. When the voltage of the phase including the aforementioned contact reverses, the bypass circuit assumes the relatively high impedance of the blocking rectifiers whereby the bypass circuit is characterized in having an extremely low impedance during contact operation and an extremely high impedance after contact operation.

In this type of transformer bypass circuit scheme, the design of the circuit is difficult and normally is done through empirical methods. In addition to this, the circuit draws a relatively large amount of power since the current drawn from the auxiliary A.-C. source is relatively high and flows for almost a full cycle.

The essence of the present invention is to insert a switching means in the bypass circuit which will cause the bypass circuit to be operative only during the relatively short break step or interval in which the contact is to be opened and thus the interval in which the bypass circuit must be operative. By way of example, I can insert a vacuum tube amplifier in the system which is normally cut-off and becomes conductive responsive to a signal derived from the commutating reactor when this reactor enters its break step.

In a like manner, transistor techniques may be used or tubes such as thyratrons which are fired when the break step begins may be used.

Accordingly, a primary object of my invention is to provide a novel controlled bypass circuit for contact means.

Another object of my invention is to provide an improvement in the transformer bypass circuit of mechanical rectifiers wherein the auxiliary power required is substantially decreased.

A further object of my invention is to provide a novel improved bypass circuit of the transformer type for mechanical rectifiers wherein design techniques are substantially simplified.

Another object of my invention is to provide a novel transformer bypass circuit for rectifier contacts which includes a switching means which closes the circuit only during the break step.

These and other objects of my invention will become apparent from the following description when taken in conjunction with the drawings in which.

Figure 1:
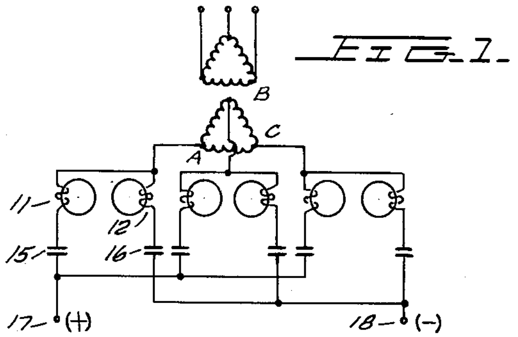
FIGURE 1 shows a schematic diagram of a three-phase double way mechanical rectifier to which my novel bypass circuit may be applied.

Referring now to FIGURE 1, there is seen one possible basic circuit for a three-phase contact rectifier. Phase A of the device comprises commutating reactors 11 and 12 and contacts 15 and 16, wherein the commutating reactor 11 and contact 15 are connected in series with the positive output terminal 17 and commutating reactor 12 and contact 16 are connected in series with the negative output terminal 18. The phases identified as phases B and C in FIGURE 1 are constructed in an identical manner to phase A.

Further details on the construction of the commutating reactors 11 and 12 and the contact devices 15 and 16 and the operation thereof, may be had with reference to U.S. Patent No. 2,759,128, issued August 14, 1956, entitled Commutating Reactors for Mechanical Rectifiers, in the name of Otto Jensen, as well as U.S. Patent No. 2,817,805, issued December 24, 1957, entitled Flux Reversal Circuit for Commutating Reactors of Mechanical Rectifiers, in the name of Edward J. Diebold.

Figure 2:
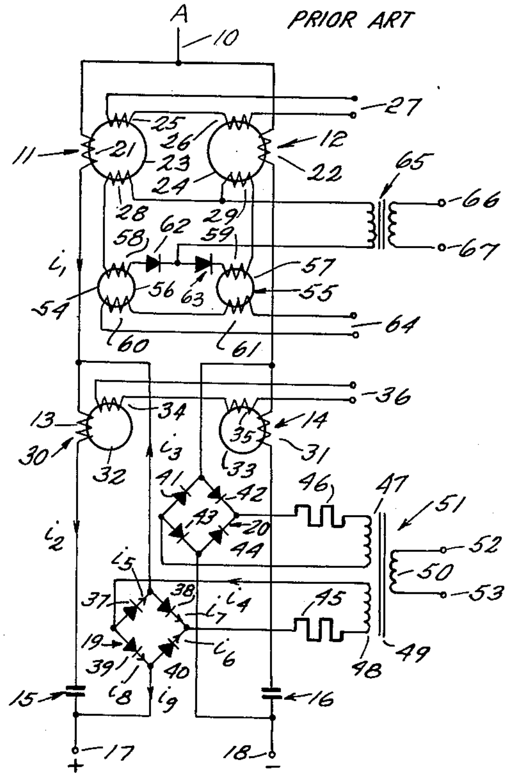
FIGURE 2 shows a typical transformer bypass circuit of the prior art as applied to one phase of the circuit of FIGURE 1.

FIGURE 2 shows phase A of FIGURE 1 with the application of the bypass circuit to which the invention applies.

The commutating reactors 11 and 12 are more specifically shown as comprising cores 23 and 24 respectively which are constructed of a highly saturable type material. Cores 23 and 24 may be provided with pre-excitation windings 25 and 26 which are energized from a source of pre-excitation energization 27. They are further provided with flux reversal windings 28 and 29 which serve to operate as a regulating means for the rectifier, and are energized by a flux reversal circuit which will be more completely described hereinafter.

The main windings 21 and 22 of commutating reactors 11 and 12 are connected in series with the contacts 15 and 16 of the rectifier which are driven into and out of engagement with one another by an operating means which may be seen with reference to U.S. Patent No. 2,759,128 above mentioned.

The bypass circuit comprises the components shown generally at 13 and 19 in the phase containing commutating reactor 11 and the components shown generally at 14 and 20 of the phase containing the commutating reactor 12. More specifically, components 13 and 14 are saturable reactors having cores 32 and 33 respectively which have windings 30, 34 and 31, 35 respectively. Saturable reactors 13 and 14 are constructed in such a manner that the magnetizing current of the windings 30 and 31 is smaller than the magnetizing current of the corresponding commutating reactor windings 21 and 22 of the commutating reactors 11 and 12.

Component 19 is a full wave bridge connected rectifier containing diode elements 37, 38, 39 and 40 which may be of the germanium or silicon type. Similarly, component 20 is a bridge connected rectifier of the same type as the bridge 19 and contains the rectifier elements 41, 42, 43 and 44.

The A.-C. terminals of each of the bridge connected rectifiers 19 and 20 are connected in parallel with the series connection of the saturable reactor windings 30 and 31 respectively and the contacts 15 and 16 respectively. The D.-C. terminals of each of the rectifiers 19 and 20 are then energized by the output of the secondary windings 47 and 48 of transformer 51 which is energized at the terminals 52 and 53 of the primary winding 50. Resistors 45 and 46 are provided in series with each of the respective rectifier circuits coming from the secondary windings 47 and 48.

Figure 3:
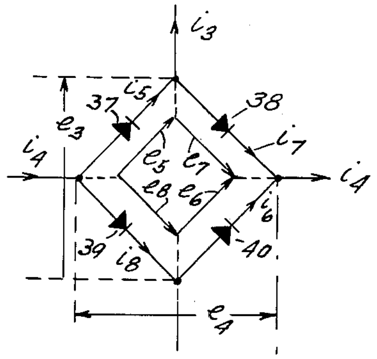
FIGURE 3 shows the bridge connected rectifier in the bypass circuit of FIGURE 2 in conjunction with its operating voltage and currents.

In order to describe the operation of the circuit of FIGURE 2, component 19 is repeated in FIGURE 3. In each branch of the bridge 19 of FIGURE 3, a current marked $i_5$, $i_6$, $i_7$ and $i_8$ flows through the diode elements 37, 40, 38 and 39 respectively. Similarly, each rectifier element 37, 40 and 38 and 39 has a voltage drop shown as a voltage $e_5$, $e_6$, $e_7$ and $e_8$ respectively.

A current $i_3$ flows into the junction between the rectifiers 39 and 40 and flows away from the junction between the rectifiers 37 and 38. Another current $i_4$ flows into the bridge at the junction between the rectifiers 37 and 39 and flows out of the bridge at the junction between the rectifiers 38 and 40. The importance of these outside currents $i_3$ and $i_4$ can be seen in FIGURE 2 where the current $i_3$ is the magnetizing current of the commutating reactor 11 which bypasses the contact 15. The current $i_4$ is provided by the transformer winding 48 and flows in series with the bridge 19 and resistor 45.

It is important to note that the two currents $i_3$ and $i_4$ are provided by different sources and both flow through the same rectifier circuit. More precisely, the current $i_4$ is a unidirectional current flowing through the two branches of the rectifier 19 and is independent of the current $i_3$ because a direct current can flow through a rectifier in the forward direction in any magnitude and is not hampered by the fact that there is a rectifier in the circuit. On the other hand, the current $i_3$ is provided from a voltage impressed from the outside and can flow through the rectifier 19 according to the impedance of its D.-C. branch which is given mainly by the resistor 45 and the voltage impressed on the winding 48 of the transformer 51.

FIGURE 3 also shows five Equations 1 through 5 connecting the voltages $e_3$ through $e_8$ and the currents $i_3$ through $i_8$, these equations being derived from a simple application of Kirchhoff's law.

Figure 4:
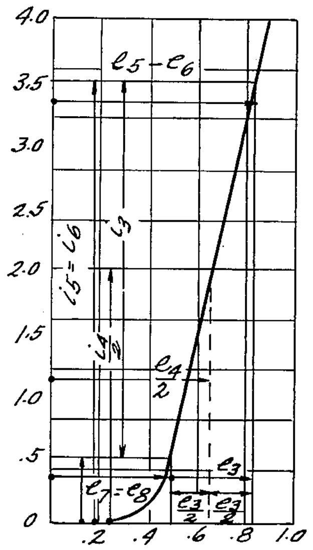
FIGURE 4 is a graphical representation of the operation of the bypass of FIGURE 2.

FIGURE 4 plots Equations 1–5 of FIGURE 3 with respect to a typical diode characteristic of the diodes used in rectifier 19 where the current values are plotted on the ordinate and voltage values are plotted on the abscissa.

From the voltages and currents shown in FIGURE 4, it is seen that the overall voltage drop $e_3$ in the direction of the bypass current is the relatively small voltage difference between the voltages $e_5$ or $e_6$ and $e_7$ or $e_8$ as may be seen from Equation 3 of FIGURE 3.

On the other hand, the voltage $e_4$ is a much larger voltage drop. The rectifier circuit therefore has the property that one circuit, which is the one supplied by the transformer 51 supplies the voltage drop for the current $i_3$ which comes from another circuit. If the voltage drop in the circuit is to be further reduced and the current $i_3$ is approximately the same value, it is possible to select the diodes in such a way that the diodes 37 and 40 which are subjected to the larger currents $i_5$ and $i_6$ have a lesser voltage drop than the diodes 39 and 38. Practically, this can be easily done because the diodes 37 and 40 have to carry a larger current and can therefore be larger area diodes whereas the diodes 38 and 39 which carry only a small current can be small area diodes. This deliberate mismatch will provide an even smaller voltage drop $e_3$ over the whole bypass rectifier.

It is to be noted that the purpose of FIGURE 4 is merely to effect a solution of Equations 1 through 5 given in FIGURE 3 for the voltage $e_3$. That is to say, it is necessary to resort to graphical means for a solution of this type in view of the non-linear nature of the forward voltage drop characteristic of the rectifier 19.

The flux reversal circuit shown in FIGURE 2 comprises the flux reversal windings 28 and 29 of the commutating reactors 11 and 12, transductors 54 and 55, a power source including the transformer 65 which is energized at terminals 66—67 and a biasing means which is energized from the terminal 64.

More specifically, the transformer 65 is connected in series with the flux reversal winding 28, winding 58 of transductor 54, and rectifier 62 while a parallel circuit is provided which includes the flux reversal winding 29, transductor winding 59 and diode 63. The connection of diodes 62 and 63 permits current to flow alternately through one branch or the other branch of the circuit.

The transductors 54 and 55 which are shown as having cores of saturable type material 56 and 57 respectively are provided with biasing windings 60 and 61 which are energized by the biasing source 64.

The operation of this circuit is as follows:

When the potential of the source 65 is in a direction to pass current through the diode 62, the volt-seconds impressed across the winding 28 will be determined by the time at which the reactor 54 saturates, which in turn is dependent upon the biasing at the biasing winding 60. In the reverse direction, or when the source 65 reverses, the reversal of flux in the core 54 is dependent upon the diodes 62 as well as the level of the bias in the biasing winding 60. The reverse voltage of transformer 65 appears on winding 58 as long as the current is in a direction of the diode 62. As soon as this current attempts to reverse, then the voltage of the transformer 65 appears on the diode 62.

The point of the transition of the voltage from the winding 58 to the diode 62 is given by the bias current flowing in winding 60. The amount of voltage which appeared during the reverse cycle on the winding 58, however, determines the amount of flux which was reset in reactor core 56, which in turn must be shifted into the opposite direction during the next successive positive cycle of the voltage in transformer 65. Hence, the flux in the core 56 must first be reversed by the voltage appearing on the winding 58 before the remainder of the voltage can appear on winding 28.

This system of flux reversal has the advantage that the control current provided by the source 64 is a direct current and that this direct current is of very small magnitude and can be provided by a source of extremely low voltage. On the other hand, the power output of the flux reversal circuit itself is provided by the power coming from the transformer 65. Therefore, a high amplification is obtained from the power source 64 to the power output into the windings 28 and 29. Another stage of power amplification then occurs between the input of the commutating reactor, or flux reversal windings 28 and 29, to the output of the mechanical rectifier on the terminals 17 and 18.

Figure 6:
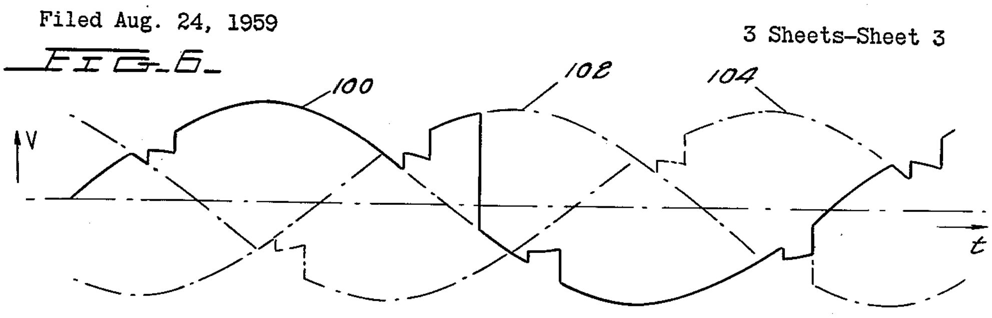
FIGURE 6 shows the contact to neutral voltages as a function of time for the three-phase double way rectifier circuit of FIGURE 1 adapted with a transformer bypass circuit.

The operation of the circuit of FIGURE 2 is further illustrated in FIGURES 6 through 10. In FIGURE 6, the three-phase voltage applied to the complete rectifier circuit of FIGURE 1 is plotted against time wherein the solid line 100 refers to the voltage of phase A, the dotted line 102 refers to phase B and the dot-dash line 104 refers to phase C.

Figure 7:
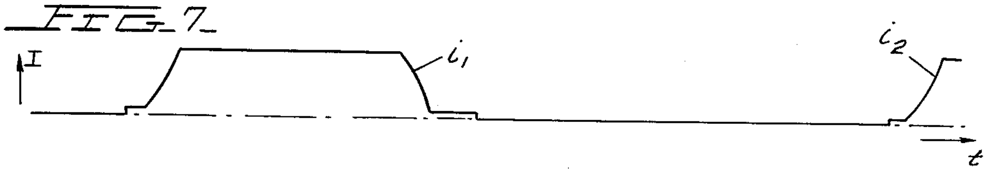
FIGURE 7 shows the contact current through one of the contacts of the three-phase double way rectifier of FIGURE 2 as a function of time and plotted on the same time scale as used in FIGURE 6.

The current flow through the positive contact 15 of phase A is illustrated in FIGURE 7 and shows the typical wave shape obtained where a commutating reactor is contained in the circuit. The current shown in FIGURE 7 is the current $i_2$ shown in FIGURE 2.

Figure 8:
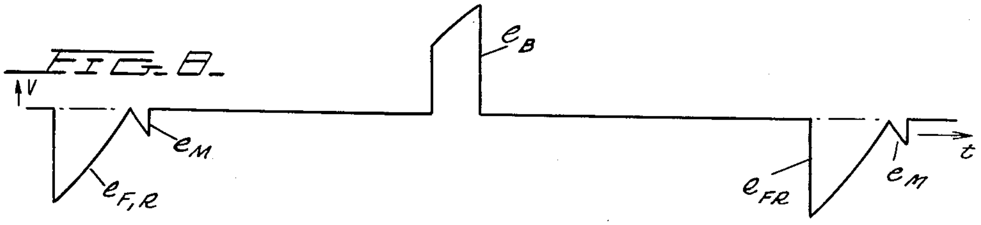
FIGURE 8 shows the voltages appearing upon the commutating reactor associated with the contact carrying the current of FIGURE 7 and plotted on the same time scale as is FIGURE 6.

The voltages appearing upon the commutating reactor winding 21 are reproduced in FIGURE 8 as $e_{FR}$ which is the voltage appearing upon the commutating reactor when the flux reversal circuit operates to reverse the commutating reactor flux; $e_m$ which is the voltage appearing on the winding 11 during the make step or during the time that the contact 15 is closed, but no power current is permitted to flow, and $e_B$ which is the voltage induced upon the commutating reactor 11 during the break step. It is during the time that $e_B$ appears that the bypass circuit is to be operative since it is during this time that the magnetizing current of the commutating reactor is to be diverted from the contact 15.

Figure 9:
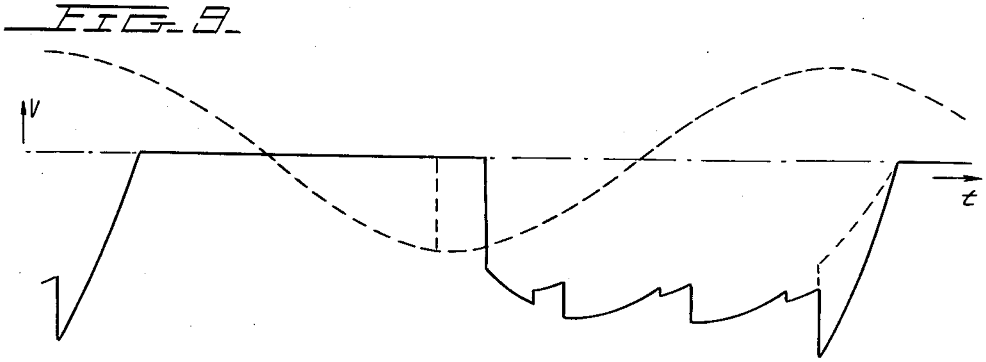
FIGURE 9 shows the bypass transformer voltage in dotted lines and the total inverse voltage on the contact for the contact having the current of FIGURE 7 therethrough, each of which are plotted against the same time scale used for FIGURE 6.

FIGURE 9 shows the voltage of the bypass transformer winding 46 in dotted lines as plotted against time and shows it as a pure sinusoidal voltage. The total inverse voltage including voltage induced during flux reversal conditions is also shown in FIGURE 9 in the solid line view and is plotted against time, it being noted that in the absence of flux reversal, the voltage would drop off as shown in the dotted lines.

Figure 10:
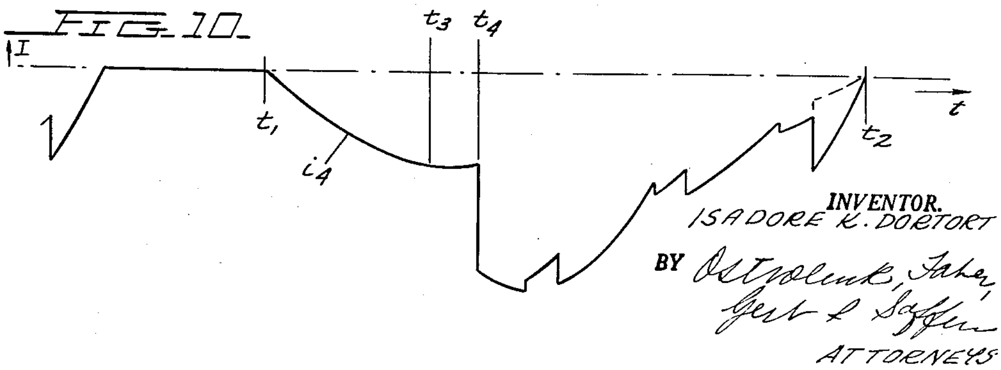
FIGURE 10 illustrates the current through the bypass circuit associated with the contact carrying the current of FIGURE 7 and plotted against the same function of time as used in FIGURE 6 and further illustrates the interval in which this current is carried in accordance with the present invention.

The bypass resistor current $i_4$ is plotted against time in FIGURE 10. The current $i_4$ of FIGURE 10 is seen to flow for a substantial length of time $t_1$ to $t_2$ in FIGURE 10 and approaches large magnitudes. In comparison to this, the bypass current is needed only during the break interval of time $t_3$ to $t_4$ shown in FIGURE 10 which is the time during which the commutating reactor executes a flux change during the break step. Outside of this area, the bypass current is not needed and merely serves as a power loss and causes the bypass circuit equipment to be larger than necessary. These losses are influenced by the choice of A.-C. voltage in relation to the inverse voltage of the main rectifier and the resistance of the D.-C. circuit of bridge 19. The optimum design of the circuit requires tedious trial and error plotting since sinusoidal quantities are not dealt with. The design is made even more difficult by a wide range of main rectifier A.-C. voltage and regulation under the influence of flux reversal circuit.

At the end of the inverse voltage interval, the current which normally continues to flow in the bypass circuit also interferes with the flux reversal operation whereby the required current flow at that time greatly increases the current and power required in the flux reversal circuit.

In accordance with the present invention, I limit the flow of bypass circuit current to the interval $t_4$ minus $t_3$ of FIGURE 10 and thus substantially reduce the power requirements of the bypass circuit as well as of circuits which are affected by this current such as the flux reversal circuit. In addition to this, the design of the circuit is substantially simplified since the selection of the A.-C. voltage of the transformer winding 46 no longer is a critical value which must be considered in relation to the power drawn by the circuit.

Figure 5:
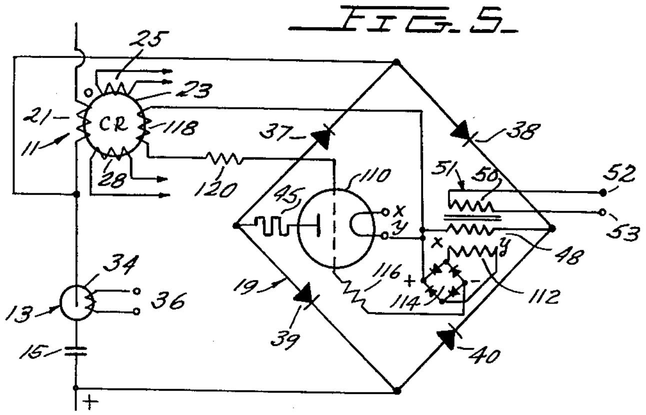
FIGURE 5 shows a first embodiment of my novel invention in connection with the bypass circuit of FIGURE 2.

A first embodiment of my novel circuit is set forth in FIGURE 5 which shows only the required portion of the circuit of FIGURE 2 necessary for the understanding of the invention. It is to be clearly understood that this modification is made to the bypass circuit associated with each of the contacts 15 and 16 of phase A shown in FIGURE 2 and that the foregoing description of FIGURES 6 through 10 applies equally to the other contacts of the rectifier circuit and that contact 15 which was chosen only for purposes of illustration.

In FIGURE 5, the portion of the circuit dealing with contact 15 is duplicated with components similar to that of FIGURE 2 bearing similar identifying numerals. Also, in FIGURE 5, the illustration of transformer 51 shows only the primary winding 50 and secondary winding 48, and winding 47 which operates with contact 16 is eliminated. A high vacuum triode 110 is connected in series with resistor 45, with the plate of tube 110 connected to one end of resistor 45 and the cathode of tube 110 connected to end of transformer winding 48. A source of heater voltage is connected across terminals X—Y to supply energy to the heater element of the tube which may have a directly heated or indirectly heated cathode.

An auxiliary winding 112 is added to transformer 51 and is connected across a small rectifier 114 to supply a negative biasing voltage between the grid and cathode of tube 1 through the biasing circuit including resistor 116. The bias obtained from rectifier 114 is sufficiently negative to normally maintain the tube 110 to cut-off so that no current flows through the circuit including resistor 45. The commutating reactor core 23 is provided with an additional signal winding 118 which is connected in the grid cathode circuit of tube 110 through resistor 120.

Since the commutating reactor is normally unsaturated, no voltage appears across winding 118. When, as shown in FIGURE 8, a voltage is induced in winding 118 due to flux reversal or the make step, the voltage is in such a direction that the lower end of winding 118 becomes negative so that tube 110 does not fire. When, however, the voltage $e_B$ of FIGURE 8 appears across winding 118, a high positive pulse voltage appears across winding 118 which becomes positive at the bottom of the winding and raises the grid bias of tube 110 to a conducting state. This occurs in FIGURE 10 at the time $t_3$ and it is at this time that bypass circuit current flows to achieve the bypass action. At time $t_4$ the end of the break step, the commutating reactor is again fully saturated and the signal voltage from winding 118 is cut-off. Accordingly, tube 110 returns to its cut-off condition and the bypass circuit again becomes inactive.

Accordingly, the bypass circuit current flows only for a relatively short time. By way of example, when the mechanical rectifier is being driven by a sixty cycle A.-C. source, the maximum time that the bypass circuit flows would be approximately two milli-seconds as compared to approximately twelve milli-seconds during each cycle in the prior art type of transformer bypass circuits. This, of course, substantially reduces the R.M.S. current in the bypass circuit and as previously described reduces the duty on the other circuits such as the flux reversal circuit.

Figure 11:
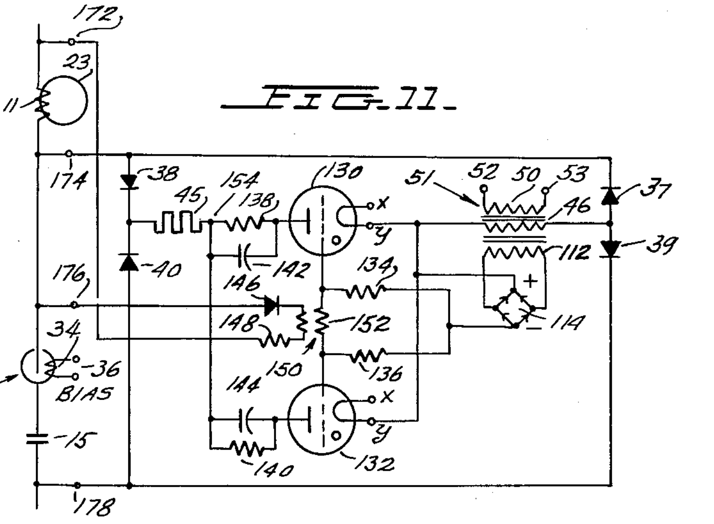
FIGURE 11 shows a second embodiment of my invention wherein the vacuum tube amplifier of FIGURE 5 is replaced by a thyratron switching scheme.

An embodiment of my novel invention which utilizes discharge tubes rather than vacuum tubes as shown in FIGURE 5 is set forth in FIGURE 11. In FIGURE 11, components similar to those of FIGURE 5 are given similar identifying numerals. It will be noted that the bridge including diodes 37 through 40 is arranged in a different manner than that of FIGURE 5 in order to simplify the diagram.

In FIGURE 11, two thyratrons 130 and 132 are utilized where thyratron 130 is primarily used to trigger the system and carry the bypass current while thyratron 132 is mainly used to cut-off thyratron 130. The grid bias for thyratrons 130 and 132 is derived through voltage source 114, connected through resistors 134 and 136 respectively. The plate of each thyratron 130 and 132 is connected through resistors 138 and 140 respectively and their parallel connected capacitors 142 and 144 respectively to one end of resistor 45. The trigger circuit for the thyratrons includes the circuit connected across winding 11 of commutating reactor core 23 and includes diode 146, resistor 148 and signal transformer 150 which has an output winding 152 connected to the control grids of tubes 130 and 132.

In operation, both thyratrons 130 and 132 are normally blocked by a negative grid bias from source 114. When the commutating reactor unsaturates during the break step, however, a short positive voltage pulse is applied to the grid of tube 130 through the signal transformer output winding 152 to fire the tube. This occurs at time $t_3$ in FIGURE 10 and permits the bypass circuit action to be initiated.

At the end of the break step at time $t_4$ in FIGURE 10, the sharp reduction of the commutating reactor voltage to zero is used to fire tube 132 in parallel with tube 130. More specifically, the impedance of signal transformer 150 and the resistor 148 are so designed that their time constant is shorter than the length of the break step or $t_4 - t_3$. Therefore, toward the end of the break step, most of the commutating reactor voltage appears across resistance 148 and not across the signal transformer 150. There is a current in the primary winding limited by 148, but none in winding 152. The grids of both tubes 130 and 132 are, therefore, negative so that when the commutating reactor voltage collapses at the end of the break step, the current in the primary winding of signal transformer 150 decays rapidly producing a reversed current in winding 152 and a positive pulse on the grid of tube 132 for firing this tube. Since capacitor 144 is initially discharged, point 154 is pulled down to the arc voltage of tube 132 momentarily. The capacitor 142 which is smaller than capacitor 144 is at this time still charged to the value of the voltage drop across resistor 138. Therefore, the voltage on the plate of tube 130 is momentarily pulled down below the extinction voltage of the tube and the current therethrough is interrupted. Reignition of the tube is prevented by an appropriate negative grid bias from source 114.

Capacitor 144 then begins to charge through the circuit including resistor 45 and tube 132 and reduces rapidly according to the time constant of the circuit. At some small value of current, the arc in tube 132 is interrupted and thus the tube is blocked or extinguished. Note that in the absence of resistor 140, capacitor 144 will remain charged so that the system would fail. Thus, resistor 140 is designed to discharge capacitor 144 before the next break step and to limit the leakage current to a value, which will not support an arc in thyratron 132.

Clearly, there are many modifications possible for the circuit of FIGURE 11 which would be well known to designers skilled in the art. For example, the structure can be adapted to operate with transistors and many circuit modifications are possible while still coming within the scope of the present invention and I intend the term triode to broadly include this general type of device.

Figure 12:
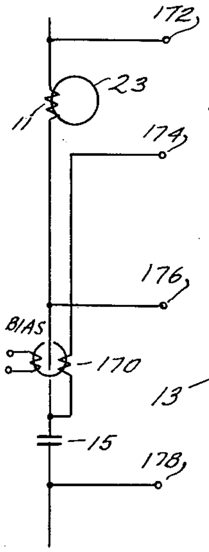
FIGURE 12 shows a second type of bypass circuit which is the equivalent of the bypass circuit of FIGURE 2 and can be used in accordance with the present invention.

FIGURE 12 illustrates the manner in which a bypass circuit of the type shown in U.S. Patent No. 2,883,603 can have the circuit of FIGURE 11 connected thereto. In FIGURE 12, the commutating reactor 23 and contact 15 are connected in series with a saturable reactor core forming a biased current transformer having an output winding 170. The terminals 174, 176, 178 and 180 receive the control circuit of the invention as shown in FIGURE 11 at corresponding terminals 174, 176, 178 and 180 in FIGURE 11 when the bypass circuit of FIGURE 11 is replaced by the bypass circuit of FIGURE 12. Clearly, the control action of the novel switching control means operates in the same manner as described in connection with FIGURE 11.

In the foregoing, I have described my invention only in connection with preferred embodiments thereof. Many variations and modifications of the principles of my invention within the scope of the description herein are obvious. Accordingly, I prefer to be bound not by the specific disclosure herein, but only by the appending claims.

I claim:

1. A bypass circuit for an electrical contact; said electrical contact being movable to open and close an electrical circuit; said bypass circuit including a single phase bridge connected rectifier; the A.-C. terminals of said rectifier being operatively connected in parallel with respect to said contact; an alternating voltage source, a switching means and a resistor; said alternating voltage source and said resistor and said switching means being connected in series with the D.-C. terminals of said rectifier; an operating means connected to said switching means; said switching means having a conducting and non-conducting condition; said switching means being operated by said operating means to said conducting condition prior to opening of said electrical circuit and to said non-conducting condition after the opening of said electrical contact said operating means operating responsive to current conduction conditions through said electrical circuit..

2. A bypass circuit for an electrical contact; said electrical contact being movable to open and close an electrical circuit; said bypass circuit including a single phase bridge connected rectifier; the A.-C. terminals of said rectifier being operatively connected in parallel with respect to said contact; an alternating voltage source, a switching means and a resistor; said alternating voltage source and said resistor and said switching means being connected in series with the D.-C. terminals of said rectifier; an operating means connected to said switching means; said switching means having a conducting and non-conducting condition; said switching means being operated by said operating means to said conducting condition prior to opening of said electrical circuit and to said non-conducting condition after the opening of said electrical contact said means operating responsive to current conduction conditions through said electrical circuit; said switching means including a triode element.

3. A bypass circuit for a contact connected in series with a commutating reactor; said contact being movable between an open and a closed position; said commutating reactor being constructed to provide a low current step within which said contact is moved to said given position; said bypass circuit comprising an auxiliary commutating reactor having a magnetizing current substantially lower than the magnetizing current of said commutating reactor connected in series with said contact and a rectifier; said rectifier being connected in parallel with said series connected auxiliary commutating reactor and contact; a switching means; said rectifier being connected in series with a voltage source and an impedance and said switching means; said voltage source being connected to pass current through said rectifier in its forward direction before said contact is moved to its said open position to provide a low impedance path for current flow in said bypass circuit; said switching means being operable between a conducting condition and a non-conducting condition; an operating means for said switching means; said switching means being operated to said conducting condition responsive to the beginning of said low current step by said operating means; said switching means being operated to its said non-conducting condition responsive to the termination of said low current step by said operating means.

4. A bypass circuit for a contact connected in series with a commutating reactor; said contact being movable between an open and a closed position; said commutating reactor being constructed to provide a low current step within which said contact is moved to said given position; said bypass circuit comprising an auxiliary commutating reactor having a magnetizing current substantially lower than the magnetizing current of said commutating reactor connected in series with said contact and a rectifier; said rectifier being connected in parallel with said series connected auxiliary commutating reactor and contact; a switching means; said rectifier being connected in series with a voltage source and an impedance and said switching means; said voltage source being connected to pass current through said rectifier in its forward direction before said contact is moved to its said open position to provide a low impedance path for current flow in said bypass circuit; said switching means being operable between a conducting condition and a non-conducting condition; an operating means for said switching means; said switching means being operated to said conducting condition responsive to the beginning of said low current step by said operating means; said switching means being operated to its said non-conducting condition responsive to the termination of said low current step by said operating means; said switching means being comprised of a triode means; said triode means having a control element operatively connected to said commutating reactor to form said operating means.

5. A bypass circuit for a contact connected in series with a commutating reactor; said contact being movable between an open and a closed position; said commutating reactor being constructed to provide a low current step within which said contact is disengaged; said bypass circuit comprising an auxiliary commutating reactor connected in series with said contact and a single phase bridge connected rectifier; the A.-C. terminals of said rectifier being connected in parallel with the series connection of said auxiliary commutating reactor and contact; an alternating voltage source, a switching means and a resistor; said alternating voltage source, said switching means and said resistor being connected in series with the D.-C. terminals of said rectifier; said switching means being operable between a conducting condition and a non-conducting condition; an operating means for said switching means; said switching means being operated to said conducting condition responsive to the beginning of said low current step by said operating means; said switching means being operated to its said non-conducting condition responsive to the termination of said low current step by said operating means.

6. In a contact converter for exchanging energy between a D.-C. system and an A.-C. system, said converter comprising the series connection of a commutating reactor, a pair of cooperating contacts being synchronously operated between an engaged and a disengaged position, said A.-C. system and said D.-C. system; a bypass circuit; said bypass circuit comprising an auxiliary commutating reactor and a rectifier; said rectifier being operatively connected in parallel with respect to said contact; a switching means; said rectifier being connected in series with a voltage source, an impedance and said switching means; said voltage source being connected to pass current through said rectifier before said contact is moved to open said electrical circuit to provide a low impedance path for current flow in said bypass circuit; said switching means being operable between a conducting condition and a non-conducting condition; an operating means for said switching means; said switching means being operated to said conducting condition responsive to the beginning of said low current step by said operating means; said switching means being operated to its said non-conducting condition responsive to the termination of said low current step by said operating means.

7. In a contact converter for energizing a D.-C. load from an A.-C. source, said converter comprising the series connection of a commutating reactor, a pair of cooperating contacts being synchronously operated between an engaged and a disengaged position, and said A.-C. source and said D.-C. load; a bypass circuit; said bypass circuit comprising an auxiliary commutating reactor having a magnetizing current substantially lower than the magnetizing current of said commutating reactor connected in series with said contact and a rectifier; said rectifier being connected in parallel with said series connected auxiliary commutating reactor and contact; a switching means; said rectifier being connected in series with a voltage source, an impedance and said switching means; said voltage source being connected to pass current through said rectifier before said contact is moved to open said electrical circuit to provide a low impedance path for current flow in said bypass circuit; said switching means being operable between a conducting condition and a non-conducting condition; said switching means being operated to said conducting condition responsive to the beginning of said low current step; said switching means being operated to its said non-conducting condition responsive to the termination of said low current step; said switching means being comprised of a triode means; said triode means having a control element operatively connected to said commutating reactor.

8. In a multi-phase contact converter for energizing a D.-C. load from a multi-phase A.-C. source, each phase of said converter comprising the series connection of a commutating reactor, a pair of cooperating contacts being synchronously operated between an engaged and a disengaged position, and said A.-C. source and said D.-C. load; a bypass circuit for each of said contacts; each of said bypass circuits comprising an auxiliary commutating reactor having a magnetizing current substantially lower than the magnetizing current of said commutating reactor connected in series with said contact of said phase and a rectifier; a switching means for each of said bypass circuits; each of said rectifiers being connected in parallel with their said respective series connected auxiliary commutating reactor and contact; each of said rectifiers being connected in series with a voltage source, an impedance and its said respective switching means; each of said voltage sources being connected to pass current through its said respective rectifier before its said respective contact is moved to their said disengaged position to provide a low impedance path for current flow in said bypass circuit; each of said rectifiers being connected to block the flow of current through their said respective contact prior to contact opening; each of said switching means being operable between a conducting condition and a non-conducting condition; said switching means being operated to said conducting condition responsive to the beginning of said low current step; said switching means being operated to its said non-conducting condition responsive to the termination of said low current step; said switching means being comprised of a triode means; said triode means having a control element operatively connected to said commutating reactor.

9. A bypass circuit for an electrical contact; said electrical contact being movable to open and close an electrical circuit; said bypass circuit comprising a saturable reactor connected in series with said contact and a single phase bridge connected rectifier; the A.-C. terminals of said rectifier being operatively connected in parallel with respect to said contact; an alternating voltage source, a switching means, and a resistor; said alternating voltage source, said switching means and said resistor being connected in series with the D.-C. terminals of said rectifier; said alternating voltage source being connected to pass current through said rectifier before said contact is moved to open said electrical circuit; the voltage drop across the A.-C. terminals of said rectifier bridge being the difference between a first voltage drop on first rectifier elements of said bridge carrying bypass circuit current and current due to said voltage source in the same direction and a second voltage drop on second rectifier elements of said bridge carrying bypass circuit current and current due to said voltage source in opposite directions; and an operating means for said switching means, said switching means having a conducting and non-conducting condition; said switching means being operated to said conducting condition prior to operation of said electrical circuit and to said non-conducting condition after the operation of said electrical contact by said operating means.

10. A bypass circuit for an electrical contact; said electrical contact being movable to open and close an electrical circuit; said bypass circuit comprising a saturable reactor connected in series with said contact and a single phase bridge connected rectifier; the A.-C. terminals of said rectifier being connected in parallel with said contact; an alternating voltage source, a switching means and a resistor; said alternating voltage source said switching means and said resistor being connected in series with the D.-C. terminals of said rectifier; said alternating voltage source being connected to pass current through said rectifier before said contact is moved to open said electrical circuit; the voltage drop across the A.-C. terminals of said rectifier bridge being the difference between a first voltage drop on first rectifier elements of said bridge carrying bypass circuit current and current due to said voltage source in the same direction and a second voltage drop on second rectifier elements of said bridge carrying bypass circuit current and current due to said voltage source in opposite directions; and an operating means for said switching means, said switching means having a conducting and non-conducting condition; said switching means being operated to said conducting condition prior to operation of said electrical circuit and to said non-conducting condition after the operation of said electrical contact by said operating means; said switching means including a triode element.

11. A bypass circuit for a contact connected in series with a commutating reactor; said contact being movable between an open and a closed position; said commutating reactor being constructed to provide a low current step within which said contact is disengaged; said bypass circuit comprising an auxiliary commutating reactor connected in series with said contact and a single phase bridge connected rectifier; the A.-C. terminals of said rectifier being connected in parallel with the series connection of said auxiliary commutating reactor and contact; an alternating voltage source, a switching means and a resistor; said alternating voltage source, said switching means and said resistor being connected in series with the D.-C. terminals of said rectifier; the voltage drop across the A.C. terminals of said rectifier bridge being the difference between a first voltage drop on first rectifier elements of said bridge carrying bypass circuit current and current due to said voltage source in the same direction and a second voltage drop on second rectifier elements of said bridge carrying bypass circuit current and current due to said voltage source in opposite directions; said first and second elements of said rectifier bridge being constructed to make said first and second voltage drops substantially equal; an operating means for said switching means; said switching means being operable between a conducting condition and a non-conducting condition; said switching means being operated to said conducting condition responsive to the beginning of said low current step by said operating means; said switching means being operated to its said non-conducting condition responsive to the termination of said low current step by said operating means.

12. In a contact converter for energizing a D.-C. load from an A.-C. source, said converter comprising the series connection of a commutating reactor, a pair of cooperating contacts being synchronously operated between an engaged and a disengaged position, said A.-C. source and said D.-C. load; a bypass circuit; said bypass circuit comprising a saturable reactor connected in series with said contact and a single phase bridge connected rectifier; the A.-C. terminals of said rectifier being connected in parallel with said contact; an alternating voltage source, a switching means and a resistor; said alternating voltage source said switching means and said resistor being connected in series with the D.-C. terminals of said rectifier; the voltage drop across the A.-C. terminals of said rectifier bridge being the difference between a first voltage drop on first rectifier elements of said bridge carrying bypass circuit current and current due to said voltage source in the same direction and a second voltage drop on second rectifier elements of said bridge carrying bypass circuit current and current due to said voltage source in opposite directions; said first and second elements of said rectifier bridge being constructed to make said first and second voltage drops substantially equal; said switching means being operable between a conducting condition and a non-conducting condition; said switching means being operated to said conducting condition responsive to the beginning of said low current step; said switching means being operated to its said non-conducting condition responsive to the termination of said low current step; said switching means being comprised of a triode means; said triode means having a control element operatively connected to said commutating reactor.

13. A bypass circuit for an electrical contact; said electrical contact being movable to open and close an electrical circuit; said bypass circuit including a rectifier, a switching means having a conducting and a non-conducting condition, a voltage source and an impedance; said rectifier being connected in parallel circuit relation with respect to said electrical contact and in series circuit relation with respect to said electrical circuit; said voltage source, said rectifier and said impedance and said switching means being connected in series with one another; said voltage source being connected to pass current through said rectifier in its direction of forward current conduction before said contact is moved to its said open postion; said rectifier being connected to normally block current flow therethrough from said electrical circuit before said contact is moved to its said open position; an operating means for said switching means; said switching means being operated by said operating means to its said conducting condition prior to opening of said electrical contact and to its said non-conducting condition after the opening of said electrical contact, said operating means operating responsive to current conduction conditions through said electrical circuit.

14. The device substantially as set forth in claim 13 wherein said switching means includes a triode element.

15. The device substantially as set forth in claim 13 wherein the impedance of said bypass circuit is substantially equal to the value of said impedance after said contact is moved to its said open position.

16. The device substantially as set forth in claim 13 wherein a saturable reactor is connected in series with said contact; said series connected saturable reactor and contact being connected in parallel with said rectifier.

References Cited in the file of this patent

UNITED STATES PATENTS 2,758,271 Rolf ---------------- Aug. 7, 1956

FOREIGN PATENTS 913,921 Germany ------------- June 21, 1954